(12) United States Patent
Mishra et al.

(10) Patent No.: US 11,580,265 B2
(45) Date of Patent: Feb. 14, 2023

(54) DELAY-BASED SIDE-CHANNEL ANALYSIS FOR TROJAN DETECTION

(71) Applicant: University of Florida Research Foundation, Inc., Gainesville, FL (US)

(72) Inventors: Prabhat Kumar Mishra, Gainesville, FL (US); Yangdi Lyu, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 232 days.

(21) Appl. No.: 17/085,213

(22) Filed: Oct. 30, 2020

(65) Prior Publication Data

US 2021/0240866 A1    Aug. 5, 2021

Related U.S. Application Data

(60) Provisional application No. 62/966,657, filed on Jan. 28, 2020.

(51) Int. Cl.
| | | |
|---|---|---|
| G06F 21/76 | (2013.01) | |
| G06F 30/3308 | (2020.01) | |
| G06F 21/56 | (2013.01) | |

(52) U.S. Cl.
CPC ............ G06F 21/76 (2013.01); G06F 21/566 (2013.01); G06F 30/3308 (2020.01)

(58) Field of Classification Search
CPC ..... G06F 21/76; G06F 21/566; G06F 30/3308
USPC ........................................................ 726/26
See application file for complete search history.

(56) References Cited

U.S. PATENT DOCUMENTS

| | | | | |
|---|---|---|---|---|
| 2012/0317454 | A1* | 12/2012 | Krenz-Baath | G06F 11/263 |
| | | | | 714/739 |
| 2013/0019324 | A1* | 1/2013 | Tehranipoor | H03K 3/0315 |
| | | | | 726/34 |
| 2017/0228562 | A1* | 8/2017 | Guilley | G09C 1/00 |
| 2017/0310688 | A1* | 10/2017 | Lecomte | H04L 63/145 |
| 2020/0387601 | A1* | 12/2020 | Schat | G06F 11/3409 |

OTHER PUBLICATIONS

Tehranipoor et al. IEEE Design & Test of Computers. "A Survey of Hardware Trojan Taxonomy and Detection". pp. 10-25. Jan./Feb. 2010.
Chakraborty et al. "MERO: A Statistical Approach for Hardware Trojan Detection". 15 pages.
Waksman et al. "FANCI: Identification of Stealthy Malicious Logic Using Boolean Functional Analysis". pp. 1-12. Nov. 2013.
Salman et al. "A Novel Technique for Improving Hardware Trojan Detection and Reducing Trojan Activation Time." IEEE Transactions on Very Large Scale Integration (VLSI) Systems. vol. 20, No. 1, pp. 112-125. Jan. 2012.

(Continued)

*Primary Examiner* — Michael S McNally
(74) *Attorney, Agent, or Firm* — Thomas | Horstemeyer, LLP

(57) ABSTRACT

The present disclosure describes various embodiments of systems, apparatuses, and methods for detecting a Trojan inserted integrated circuit design using delay-based side channel analysis. In one such embodiment, an automated test generation algorithm produces test patterns that are likely to activate trigger conditions and change critical paths of an integrated circuit design.

17 Claims, 8 Drawing Sheets

(56) References Cited

OTHER PUBLICATIONS

Wu et al. "TPAD: Hardware Trojan Prevention and Detection for Trusted Integrated Circuits," IEEE Transactions on Computer-Aided Design of Integrated Circuits and Systems. vol. 35, No. 4, pp. 521-534. Apr. 2016.
Lyu et al. "Automated Trigger Activation by Repeated Maximal Clique Sampling." pp. 482-487. Downloaded on Jul. 2, 2021 from IEEE Xplore. 2020.
Farahmandi et al. "Trojan Localization using Symbolic Algebra." pp. 591-597. Downloaded on Jul. 2, 2021 from IEEE Xplore. 2017.
Ahmed et al. "Scalable Hardware Trojan Activation by Interleaving Concrete Simulation and Symbolic Execution." Paper 6.1. International Test Conference. pp. 1-10. Downloaded on Jul. 2, 2021 from IEEE Xplore. 2018.
Cruz et al. "An Automated Configurable Trojan Insertion Framework for Dynamic Trust Benchmarks". pp. 1598-1603. Downloaded on Jul. 2, 2021 from IEEE Xplore. 2018.
Cruz et al. "Hardware Trojan Detection using ATPG and Model Checking". pp. 91-96. Downloaded on Jul. 2, 2021 from IEEE Xplore. 2017.
Agrawal et al. "Trojan Detection using IC Fingerprinting". IEEE Symposium on Security and Privacy. Computer Society. 15 pages. 2007.
Jin et al. "Hardware Trojan Detection Using Path Delay Fingerprint". 7 pages. Downloaded on Jul. 2, 2021 from IEEE Xplore.
Aarestad et al. "Detecting Trojans Through Leakage Current Analysis Using Multiple Supply Pad IDDQS". IEEE Transactions on Information Forensics and Security. vol. 5, No. 4, pp. 893-904. Dec. 2010.
Cha et al. "Trojan Detection via Delay Measurements: A New Approach to Select Paths and Vectors to Maximize Effectiveness and Minimize Cost". 6 pages. Downloaded on Jul. 2, 2021 from IEEE Xplore. 2013.
Ngo et al. "Hardware Trojan Detection by Delay and Electromagnetic Measurements", pp. 782-787. Downloaded on Jul. 2, 2021 from IEEE Xplore. 2015.
Plusquellic et al. "On Detecting Delaying Anomalies Introduced by Hardware Trojans". 7 pages. Downloaded on Jul. 2, 2021 from IEEE Xplore. 2016.
Huang et al. "Scalable Test Generation for Trojan Detection Using Side Channel Analysis". IEEE Transactions on Information Forensics and Security. vol. 13, No. 11, pp. 2746-2760. Nov. 2018.
Huang et al. "MERS: Statistical Test Generation for Side-Channel Analysis based Trojan Detection". pp. 130-141. Oct. 24-28, 2016.
Lyu et al. "A Survey of Side-Channel Attacks on Caches and Countermeasures". Journal of Hardware and Systems Security. vol 2, pp. 33-50. 2018.
Lyu et al. "Efficient Test Generation for Trojan Detection using Side Channel Analysis". pp. 408-413. 2019.
Li et al. "Negative-Skewed Shadow Registers for At-Speed Delay Variation Characterization". IEEE. pp. 354-359. 2007.

* cited by examiner

DELAY-BASED SIDE-CHANNEL ANALYSIS FOR TROJAN DETECTION

CROSS-REFERENCE TO RELATED APPLICATION

This application claims priority to U.S. provisional application entitled, "Delay-Based Side-Channel Analysis for Trojan Detection," having Ser. No. 62/966,657, filed Jan. 28, 2020, which is entirely incorporated herein by reference.

STATEMENT REGARDING FEDERALLY SPONSORED RESEARCH OR DEVELOPMENT

This invention was made with government support under 1908131 awarded by the National Science Foundation. The government has certain rights in the invention.

BACKGROUND

Side-channel analysis is widely used for hardware Trojan detection in integrated circuits by analyzing various side-channel signatures, such as timing, power, and path delay. Existing delay-based side-channel analysis techniques have two major bottlenecks: (i) they are not suitable in detecting Trojans since the delay difference between the golden design and a Trojan inserted design is negligible, and (ii) they are not effective in creating robust delay signatures due to a reliance on random and Automatic Test Pattern Generation (ATPG) based test patterns.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure describes various embodiments of systems, apparatuses, and methods for detecting a Trojan inserted integrated circuit design using delay-based side channel analysis. In one such embodiment, an automated test generation algorithm produces test patterns that are likely to activate trigger conditions and change critical paths in accordance with embodiments of the present disclosure, in which a critical path is defined as a path between an input and output with the maximum delay. Compared to existing approaches where a delay difference is solely based on extra gates from a small Trojan, the change of critical paths (responsive to activation of triggering condition(s)) leads to a significant difference in path delay. Additionally, a fast and efficient reordering technique may be employed to maximize the delay deviation between the golden design and the Trojan inserted design, in various embodiments. Experimental results demonstrate that an exemplary approach in accordance with the present disclosure significantly outperforms state-of-the-art approaches that rely on ATPG or random test patterns for delay-based side-channel analysis.

Figure 1:
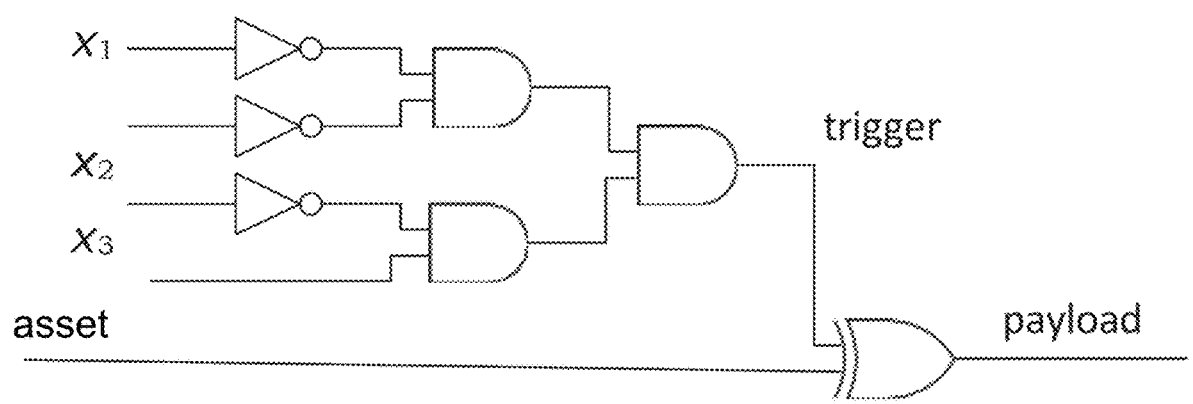
FIG. 1 shows an exemplary Trojan circuit design that includes four rare signals, such that when the trigger condition is activated, the payload receives an inverted asset value.

Malicious implants are widely acknowledged as a major threat in System-on-Chip (SoC) design methodology due to the inherent supply chain vulnerabilities. Hardware Trojans can be inserted by a malicious third party to either alter the functionality or leak information from the design. In order to design trustworthy SoCs, it is critical to ensure that the intellectual property cores (IPs) manufactured by third parties are Trojan-free. Detection of hardware Trojans is challenging due to their stealthy nature. A Trojan normally contains a rare trigger condition and a payload. The trigger condition is carefully crafted such that the payload is only activated under extremely rare conditions. The functionality of a design remains exactly the same as the golden design when the trigger condition is not satisfied. An example Trojan circuit design is shown in FIG. 1, where asset represents the signal that the attacker wants to invert by creating a trigger condition using four rare signals, $x_1, x_2, x_3, x_4$.

Side-channel analysis is promising for Trojan detection, but it faces two major challenges. The first challenge comes from the process variation and environmental noise. As transistor dimensions continue to shrink, it introduces increasing process variations across integrated circuits (ICs) of the same design. Since the Trojans are typically small (e.g., few gates in a million-gate IC), the deviation due to the presence of a Trojan is negligible with respect to process variation and environmental noise. As a result, any measured deviation in a side-channel signature cannot guarantee the existence of a Trojan. The second challenge is how to automatically generate high quality test patterns that can sensitize critical paths. The state-of-the-art path delay-based approaches utilize random or ATPG-based test generation techniques. However, the delay difference generated by these approaches is typically too small to provide a high confidence in Trojan detection.

To overcome these challenges, an automated approach has been developed to generate high quality test patterns for path delay-based side-channel analysis to significantly improve the side-channel sensitivity, in accordance with embodiments of the present disclosure. It is noted that tests generated by logic testing are more likely to activate trigger conditions, and by utilizing these tests, two completely different critical paths can be produced for the same register in the golden design and in a Trojan-inserted design. As a result, the activation of trigger conditions can lead to significantly different path delays, compared to the negligible delay introduced by a few extra gates (from a Trojan) in a fixed critical path. Thus, embodiments in accordance with the present disclosure provide an efficient test generation method to maximize observable path delays by changing critical paths and an exemplary lightweight and effective logic testing algorithm to generate tests for delay-based side-channel analysis. The generated tests assume no preliminary information about critical paths or trigger conditions. Such embodiments may also perform a Hamming-distance based reordering of the generated tests, in which a distance evaluation method has been designed to increase the probability of constructing a critical path from the trigger to the payload.

There are a wide variety of approaches for Trojan detection. Logic testing compares the outputs of an implementation to a golden specification. Side-channel analysis, on the other hand, examines side effects of the inserted Trojans, such as power, dynamic current, and path delay. Given the exponential test space complexity, it may not be feasible to activate a rare trigger condition and propagate the Trojan effects to observable outputs. Probabilistic test generation techniques are promising (e.g., N-detect approach) to increase the likelihood of Trojan detection. While side-channel analysis does not have these requirements, it has a major challenge of low side-channel sensitivity. Since the inserted Trojan is relatively small (few gates) in a large design, the side-channel footprint of a Trojan is likely to be dominated by process variations and environmental noise margins.

Path delay-based side-channel analysis is beneficial compared to other side-channel parameters as the delay of each output can be measured independently, and an inserted Trojan may affect multiple observable outputs. The delay is expected to be greater than the delay in the golden design with extra gates inserted. The main challenge in a path delay-based approach is to find a suitable input pattern (test) that can reveal a delay difference introduced by the Trojan. Existing approaches apply a static analysis on the design to find all possible paths and use Automatic Test Pattern Generation (ATPG) tools to generate test patterns that are able to sensitize these paths. For example, Jin et al. used Synopsys TetraMAX to analyze the design and generate test patterns to cover every path. See Y. Jin and Y. Makris, "Hardware Trojan Detection Using Path Delay Fingerprint," in 2008 IEEE International Workshop on Hardware-Oriented Security and Trust, pp. 51-57. However, this approach is time-consuming and is not scalable for large designs since the number of possible paths grows exponentially with the size of the design. In addition, the small delay difference introduced by the Trojan is likely to be dominated by a large process variation and environmental noise. In accordance with embodiments of the present disclosure, an approach to significantly increase the delay difference is performed by changing the critical paths to offset possible noise. It is noted that existing statistical and learning approaches are applicable to the delay profiles generated by an exemplary approach of the present disclosure to achieve better results.

There are two types of effects that a Trojan has over the path delay. The first one comes from the change of fan-out. In FIG. 1, as the trigger points ($x_1, \ldots, x_4$) connect to an extra gate compared to the golden design, the gates that produce these signals will change their capacitive load. As a result, the propagation delay of these gates will increase. The other type of impact is from the extra gates that are inserted by the payload. For example, the XOR gate in FIG. 1 is inserted to change the value of asset when the trigger is activated. This extra XOR gate adds to the total path delay for any path passing through it.

Figure 2:
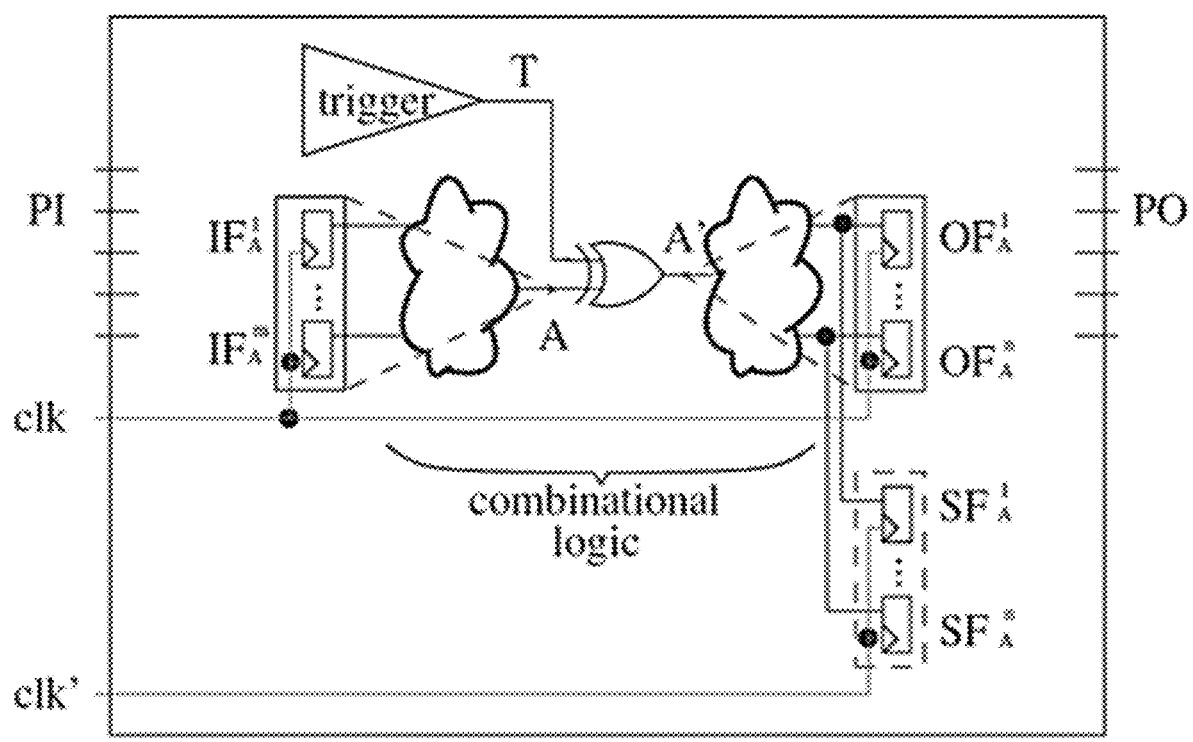
FIG. 2 illustrates a conventional path delay measurement setup using shadow registers within an integrated circuit.

The main challenge in Trojan detection using delay-based side-channel analysis is how to increase the observability. One of the common methods to measure path delay is using shadow registers (SF). As shown in FIG. 2, the original registers and shadow registers utilize different clocks to measure delays by controlling the skew of clk and clk'. The registers of the input layer and the output layer of the asset A are represented using $IF^i_A$ and $OF^j_A$, respectively. The path delay is measured by tuning clk' and comparing the values in the corresponding register of the output layer and the shadow registers, e.g., $OF^1_A$ and $SF^1_A$. Accordingly, the original clk is used to maintain the correct functionality, while the second clk' can be tuned to find out the exact time of a signal flipping by comparing the values in corresponding registers. As a result, there would be no delay if the signal value does not change between two simulations. For example, when the value of $OF^1_A$ remains the same between the two simulations, $SF^1_A$ will have the same value as $OF^1_A$ irrespective of how clk' is tuned, thus, no delay information can be retrieved.

The input layer of a signal contains all the registers encountered in the immediately preceding layer in the path from the signal to the primary inputs, and the output layer of a signal contains all the registers encountered in the immediately succeeding layer in the path from the signal to the primary outputs. To observe the delay caused by the inserted Trojan, the critical path of some register in the output layer of A, e.g., $OF^1_A$ in FIG. 2, needs to contain register A'. Otherwise, the delay between the input layer and the output layer will be almost the same between the golden design and the Trojan-inserted design (only differed slightly due to capacitance change). With the critical path crossing A', the signal value of A' has to switch to reveal delay information, either by trigger T or by asset A. In addition, there must exist a path from A' to the output layer where all signals need to switch. In accordance with the present disclosure, test vectors are generated that are able to maximize the delay difference of a critical path from the Trojan to the output layer.

Figure 3:
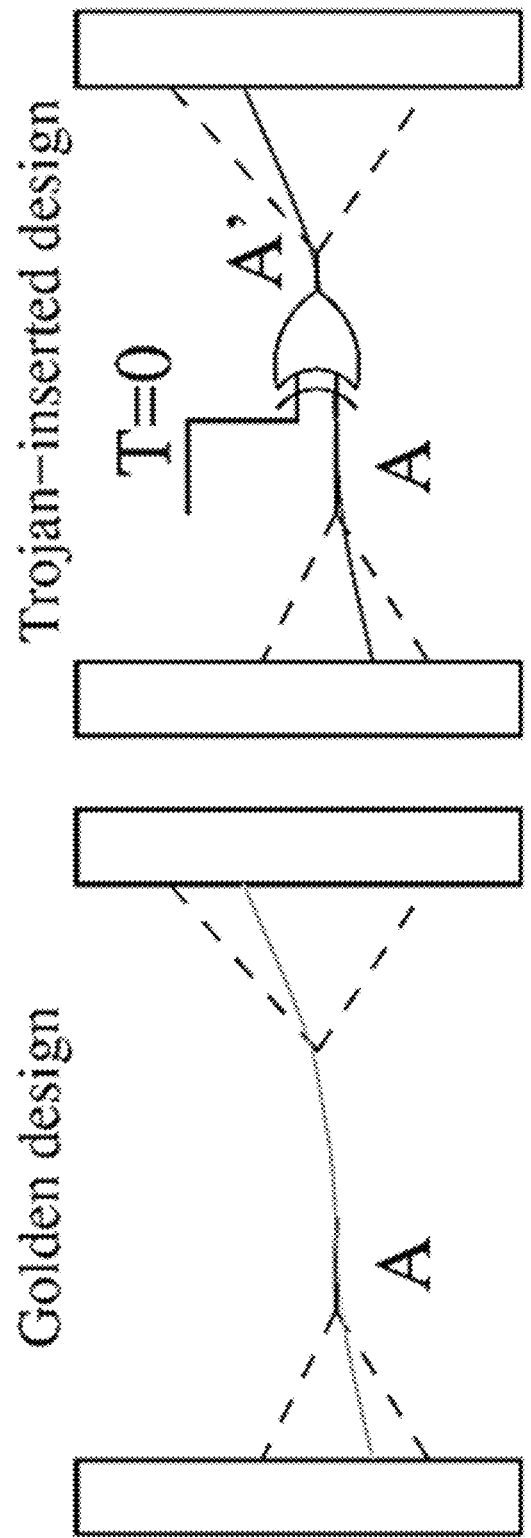
FIG. 3 demonstrates that a delay can differ by one gate along the same critical path between a golden design and the Trojan-inserted design in existing approaches.
Figure 4:
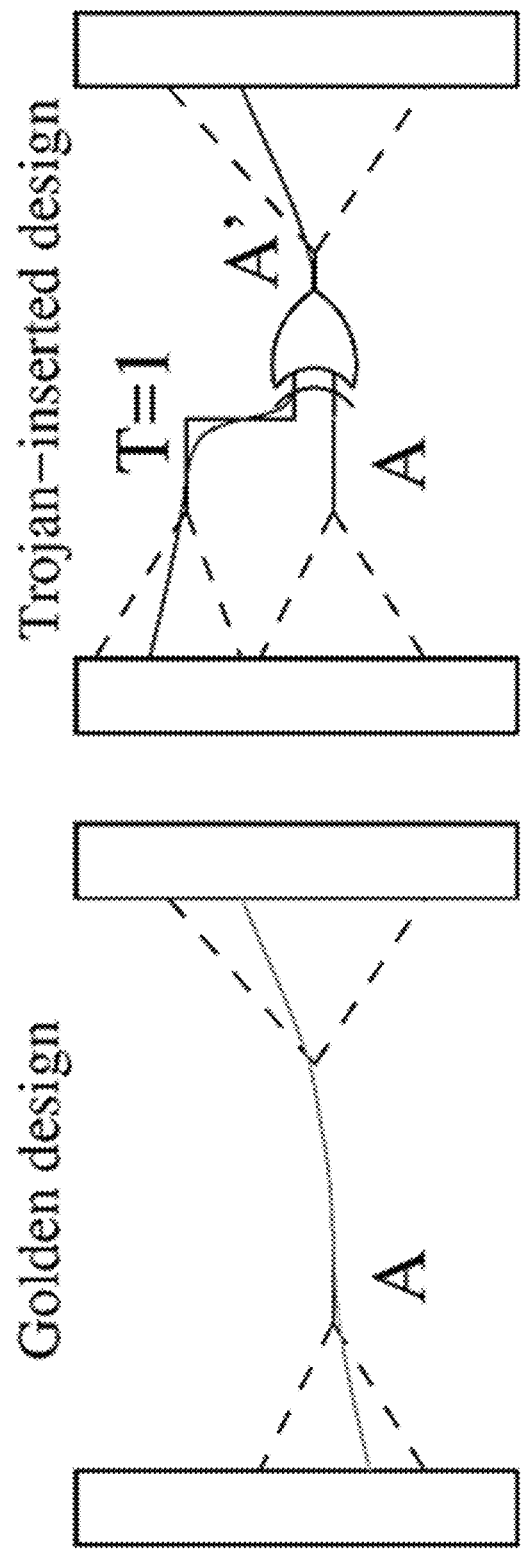
FIG. 4 demonstrates a maximation of delay differences by changing critical paths in accordance with embodiments of the present disclosure.

The activation of a trigger is important in maximizing the delay difference. Existing approaches try to find critical paths that are affected by the Trojan. However, without the activation of a trigger, the delay difference is at most one gate difference. As shown in FIG. 3, the trigger signal T remains zero and the Trojan-inserted design behaves exactly the same as the original design. As a result, any delay information from the input layer to T is hidden and the delay of A' is determined by A. Let's assume a critical path is able to be constructed from A to the output layer using a specific test vector. Since the behaviors of the golden design and the Trojan-inserted design are the same, two critical paths are the same except for the extra XOR gate. On the other hand, the critical paths can change significantly when the trigger is activated. FIG. 4 shows an exemplary scenario of maximizing the delay difference. In FIG. 4, the critical path in the Trojan-inserted design goes through the trigger T and propagates the delay to the output layer, which is completely different from the path in the golden design. As a result of two totally different critical paths, the measured delay difference in the output layer can be significantly larger, compared to the scenario when the trigger is not activated in FIG. 3.

Therefore, an exemplary test generation technique, in accordance with embodiments of the present disclosure, increases the probability of activating trigger conditions. As the attackers are more likely to construct trigger conditions using rare signals, various embodiments of the present disclosure use a Boolean satisfiability (SAT)-based approach to generate test patterns directed to activating hardware Trojan(s), as represented in Algorithm 1 (below). First, the circuit is parsed and logic expressions are computed for all rare signals. Then, the process is repeated k times to generate k test vectors, where k is defined to balance debug time and performance. In the $i^{th}$ iteration, the order of rare nodes is randomized such that the generated tests can cover different sets of rare nodes each time. A rare node has a low transition probability within the integrated circuit. Next, rare nodes are repeatedly added into the current trigger CT if CT is still valid. Finally, an SAT solver is used to return a test for CT. Intuitively, a test is desired to be generated that is able to activate as many rare nodes as possible. Since an adversary wants to hide from side-channel analysis, i.e., introduce the minimum delay, the number of trigger points is typically small. The test that is able to activate many rare nodes has the high probability of covering an unknown trigger condition. Note that the goal of an exemplary test generation partially overlaps with logic testing, without the requirement of propagating the effects of payload to the primary output. Experiments show that the lightweight algorithm is effective in delay-based side-channel analysis. An exemplary framework of the present disclosure can perform better in the presence of advanced logic testing techniques.

Algorithm 1: Test Generation

```
Input: circuit netlist, a set of rare nodes (R), the
       number of test vectors k
Output: test vectors T = {t₁, t₂, . . . , tₖ}
1   Parse circuit netlist, and compute logic expression
    for each rare node;
2   Initialize T = { };
3   i = 1;
4   repeat
5   |   Current trigger CT = Ø;
6   |   Randomize the order of rare nodes R;
7   |   for rare node r ∈ R do
8   |   |   if CT ∪ r is a valid trigger then
9   |   |   |   CT = CT ∪ r;
10  |   |   end
11  |   end
12  |   Solve CT and get a test t;
13  |   tᵢ = t;
14  |   i = i + 1;
15  until i > k;
16  Return T = {t₁, t₂, . . . , tₖ}
```

Figure 5:
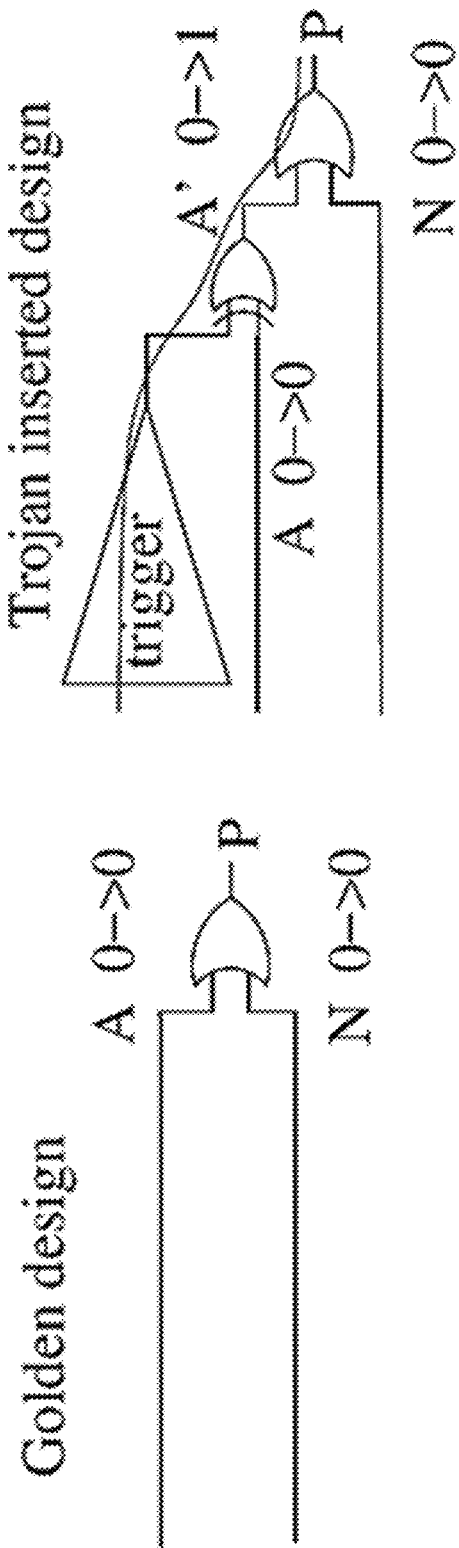
FIG. 5 illustrates the difficulty of creating a critical path from the trigger T to the output layer in a Trojan inserted design.

Activating the trigger is not a sufficient condition to introduce a delay of the Trojan to the output layer. The delay also requires construction of a critical path from the Trojan to the output layer. This is a strict condition due to the following reasons. First, the trigger signal T has to switch between two consecutive simulations. Otherwise, the critical path will not pass through the trigger signal. Next, every signal in the critical path has to switch. FIG. 5 shows an example to illustrate the difficulty of creating a critical path from the trigger T to the output layer. In particular, there are many constraints to ensure a critical path from the trigger to the output layer. For example, let's assume that the payload A' flips from 0 to 1 due to the activation of the trigger condition. In order to propagate the delay, the signal P has to flip from 0 to 1, which requires signal N to have value 0 in the first simulation. When we consider all the signals in a path from A' to the output layer, more and more constraints need to be applied. Directed test generation, such as an ATPG or SAT-based approach, can be used to find the optimal solution when the payload is known. However, as the exact place of the trigger and payload are not known a priori, these approaches may not work. Thus, various embodiments of the present disclose utilize a probabilistic approach to increase the likelihood of constructing such a critical path using Hamming-distance based reordering.

Algorithm 2 (below) shows an exemplary reordering approach to statistically create a critical path and maximize sensitivity. The main idea is to find a test vector that differs from the current test vector mostly as its successor. The distance of two vectors is defined as the summation of two parts. The first part is the Hamming distance of the feature vector, which represents the activation status of all rare signals. For example, assuming a test t is able to activate the first three rare signals in FIG. 1, then its feature vector is 1110. With a larger difference in the feature vector of two test vectors, one trigger condition is less likely to be activated by the two vectors simultaneously. The second part is the Hamming distance of the test vectors. A large Hamming distance between the test vectors increases the probability of signal switches in the cone area impacted by A'. As a large difference in the feature vectors of two tests $t_i$ and $t_j$ typically implies a large Hamming distance of these two test vectors, a small weight (e.g., 0.1 in Algorithm 2) is added to the Hamming distance of test vectors (the latter part). As shown in Algorithm 2, the design is first simulated, and the feature vector for all test vectors is computed. For each test vector $t_i$, the algorithm tries to find the test vector with the largest distance among the remaining ones as its successor (line 7-16). After finding the test vector, the algorithm swaps the test vector with $t_{i+1}$ (line 17).

Algorithm 2: Hamming-distance based Reordeing

```
Input: circuit netlist, test vectors T = {t₁, t₂, . . . , tₖ}
Output: reordered test vectors T
1   for tᵢin T do
2   |   Simulate the netlist with tᵢ;
3   |   Set feature vector of tᵢ: each bit of fvᵢrepresents
        whether a certain rare signal is activated or not;
4   end
5   Set weight ω = 0.1;
6   for i = 1 to k do
7   |   Initialize best successor for tᵢas
        |   bestSuccessor = -1;
8   |   Initialize the largest distance as maxdist = -1;
9   |   for j = i + 1 to k do
10  |   |   The distance of feature vector
        |   |   dist1 = Hamming(fvᵢ, fvⱼ);
11  |   |   The distance of test vectors
        |   |   dist2 = Hamming(tᵢ, tⱼ);
12  |   |   if dist1 + w * dist2 > maxdist then
13  |   |   |   maxdist = dist1 + ω * dist2;
14  |   |   |   beSuccessor = j;
15  |   |   end
16  |   end
17  |   Swap the test vectors of $t_{i+1}$ and $t_{bestSuccessor}$;
18  end
19  Return T;
```

Figure 6:
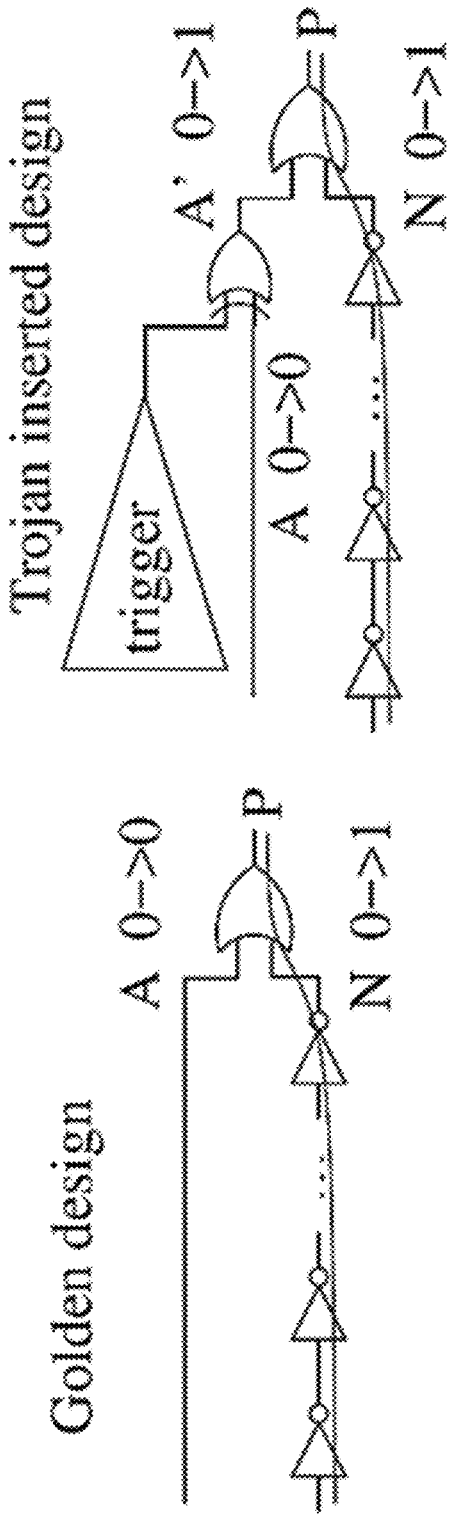
FIG. 6 demonstrates that a delay from the trigger may be masked by any signal in the path from A' to the output layer with longer delays.

The Hamming-distance based reordering is efficient with k simulations and $O(k^2)$ computations of Hamming distance, where k is the number of generated test patterns. As the Trojan is unknown, the generated tests may not be able to sensitize the critical path from A' to the output layer. For example, when the signal N in the longer path switches, the delay of P is determined by N, which masks the delay from the Trojan as shown in FIG. 6. As a result, there would be no difference between the delays from the golden design and the Trojan inserted design. In general, for some path from A' to the output layer, all neighbor signals with longer delays need to remain the same value. However, without knowing the exact Trojan, this requirement is hard to fulfill. Fortunately, as an attacker is likely to construct a hard-to-activate trigger condition, the path from the input layer to the trigger T is typically long and potentially produces large delay in the trigger signal T, which leads to detection of Trojans (as demonstrated below).

For testing purposes, all of the algorithms and simulators are implemented in C++. The SAT expressions in Algorithm 1 are solved using Z3. The experiments are conducted using a machine with Intel Xeon CPU E5-1620 v3 @ 3.50 GHz and 16 GB RAM. To evaluate the effectiveness of an exemplary approach in detecting hardware Trojans, five sequential benchmarks from ISCAS-89 are selected, as well as a large benchmark MIPS from OpenCores. Trojans are inserted in the same way as FIG. 1, using rare signals to construct trigger conditions. For the two small ISCAS-89 benchmarks, s1196 and s1423, each trigger condition is constructed by 4 trigger points, while Trojans of the other benchmarks are constructed by 8 trigger points. All trigger points are selected from rare nodes from the design, where the rareness thresholds are 0.1 for ISCAS benchmarks and 0.005 for MIPS. The total number of rare nodes is listed in Table II. For each benchmark, 1000 Trojans are randomly sampled. Each Trojan is inserted into the golden design to form one DUT (device under test). In other words, there are 1000 DUTs for each benchmark to evaluate the performance.

The path delay can be measured using static timing analysis of gate-level models. First, the benchmarks were compiled using Synopsys Design Compiler. Next, a Standard Delay Format (SDF) file was generated that contains delay information of each gate and net in the design by linking with saed 90 nm library. Finally, SDF files are back-annotated into the simulator. The simulator simulates all DUTs with generated test patterns and reports delay information computed using corresponding SDF files. Due to many factors in manufacturing steps, there are process variations in ICs, resulting in different delay fingerprints of the same design. To reflect the process variations, ±7.5% random variations were added to the SDF file of each DUT.

To evaluate the effectiveness of the generated tests by all approaches in detecting Trojans, the golden design was first simulated with the tests, and the delay information was obtained of all registers. $dl^f_{gold}(t)$ was used to denote the delay for the register f of the golden design when simulating test pattern t. Then, each DUT was simulated with these tests, and the delay information of all registers was obtained. Similarly, $dl^f_{dut}(t)$ was used to denote the delay for the register f in the DUT when simulating test pattern t. Finally, the maximum difference between the two delays which belong to the same register f is reported as our metrics to evaluate the performance of the tests from all approaches in equation (1):

$$diff = \max_{t,f}(|dl^f_{dut}(t) - dl^f_{gold}(t)|) \quad (1)$$

If we assume that the test vector t* produces the maximum delay difference in the register f* for a given DUT, i.e., achieves the largest metric in equation (1), the following symbols can be defined for the ease of illustration:

OrigDelay: the delay of in the golden design when applying t*, i.e., $dl^{f*}_{gold}(t^*)$ Sensitivity: the relative difference of delays in golden design and DUT, i.e., $diff/dl^{f*}_{gold}(t^*)$.

Table I (below) summarizes experimental results from the application of an exemplary approach ("Our Approach") of the present disclosure on the benchmarks compared to random test vectors and ATPG test vectors. For a random simulation, 10K random vectors were generated for each benchmark. The number of random test vectors is selected to balance the overall performance and simulation time. To generate ATPG test vectors for path delays, TetraMAX with all delay faults and full sequential mode was utilized. For the exemplary approach, the number of test vectors was fixed to be 1000 for all benchmarks, i.e., k=1000 for Algorithm 1. For each approach, Table I summarizes the number of test vectors (#), OrigDelay, delay difference (diff), and the average sensitivity over 1000 randomly sampled Trojans. From the results, we can see that random test vectors and ATPG achieve high delay sensitivity in small designs. However, the sensitivity produced by these two approaches are within 5% for two large benchmarks s38417 and MIPS, which is typically introduced by the noise. In contrast, the exemplary approach ("Our Approach") is able to achieve high sensitivity consistently. Overall, the exemplary approach can achieve 16- and 18-times improvement of sensitivity in delay-based side-channel analysis over random test vectors and ATPG, respectively.

TABLE I

| | Random | | | | ATPG | | | | Our Approach | | | | |
|---|---|---|---|---|---|---|---|---|---|---|---|---|---|
| benchmark | # | OrigDelay (ps) | diff (ps) | sensi-tivity | # | OrigDelay (ps) | diff (ps) | sensi-tivity | # | OrigDelay (ps) | diff (ps) | sensi-tivity | impro./ Random | impro./ ATPG |
| s1196 | 10K | 1347 | 702 | 52% | 221 | 1622 | 415 | 26% | 1000 | 1073 | 1221 | 114% | 2.2x | 4.4x |
| s1423 | 10K | 1586 | 313 | 20% | 103 | 1385 | 173 | 12% | 1000 | 675 | 1456 | 216% | 11x | 17x |
| s13207 | 10K | 2108 | 169 | 8% | 411 | 1553 | 144 | 9.3% | 1000 | 1478 | 931 | 63% | 7.9x | 6.8x |
| s15850 | 10K | 2370 | 192 | 8.1% | 472 | 2149 | 178 | 8.3% | 1000 | 2249 | 682 | 30% | 3.7x | 3.7x |
| s38417 | 10K | 31826 | 1279 | 4% | 1169 | 28729 | 1161 | 4% | 1000 | 14768 | 11738 | 80% | 20x | 20x |
| MIPS | 10K | 62998 | 2495 | 4% | 1363 | 61751 | 2446 | 4% | 1000 | 21156 | 18227 | 86% | 22x | 22x |
| Average | 10K | 17039 | 858 | 5% | 623 | 16198 | 753 | 4.6% | 1000 | 6900 | 5709 | 83% | 16x | 18x |

Figure 7:
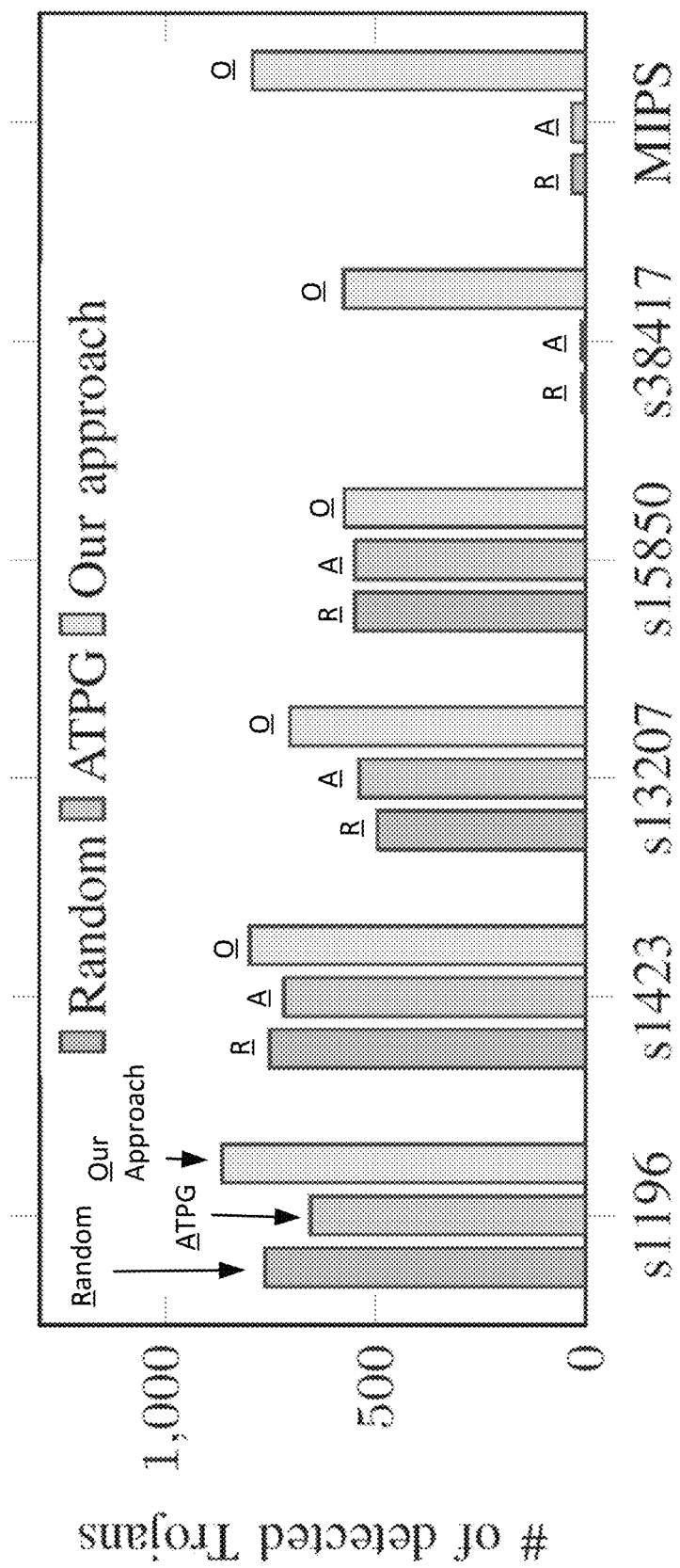
FIG. 7 illustrates the number of detected Trojan given the noise of ±7.5% noise using an exemplary embodiment of the present disclosure.

With the huge improvements in delay difference, the exemplary approach is able to detect more Trojans. In this experiment, a simple approach is used to declare the existence of a Trojan: if the delay in a DUT deviates from the delay in the golden design by more than the noise threshold (7.5%), then a Trojan is declared to exist in the DUT. FIG. 7 shows the number of detected Trojans by these approaches. Among the 1000 randomly sampled Trojans, random simulation and ATPG are able to detect a reasonable number of Trojans in the small design. However, the performance of these two approaches is poor for large designs, which detect less than 3% of all Trojans. On the other hand, the exemplary approach ("Our Approach") is able to detect more than half of the all Trojans for all benchmarks.

Note that the performance of random simulation and ATPG is becoming worse when the design becomes large. It is due to the fact that the path between the input layer and the output layer in the small designs are relatively small, typically containing less than 10 gates. Therefore, an extra XOR gate from the Trojan can introduce reasonable delay difference to the delay of the output layer compared to 7.5% noise. However, when the number of gates increases in the paths, the effect of an extra gate becomes negligible. In contrast, the exemplary approach achieves consistent good performance in the all designs, due to the selection of test vectors that are likely to change the critical paths for the output layer entirely, as shown in FIG. 4. In large designs, the change of critical paths is more likely to introduce drastically different delays.

The running time of the exemplary approach is shown in Table II (below). The results show that the exemplary approach is efficient in generating test vectors for both ISCAS benchmarks and MIPS. For all benchmarks except for s38417, the total test generation time is within 20 minutes. This relatively longer time for s38417, which is less than 2 hours, is because that the number of rare nodes in s38417 is more than three times the number of rare nodes in all the other benchmarks. Overall, the exemplary approach can generate 1000 test vectors efficiently.

TABLE II

| bench | # gates | # wires | # rare | Algo. 1 | Algo. 2 | total |
|---|---|---|---|---|---|---|
| s1196 | 550 | 568 | 195 | 33.6s | 0.2s | 33.8s |
| s1423 | 456 | 502 | 50 | 26.5s | 0.05s | 26.6s |
| s13207 | 2335 | 2504 | 604 | 150.8s | 0.5s | 151s |
| s15850 | 2812 | 3004 | 649 | 352s | 0.5s | 353s |
| s38417 | 23815 | 23844 | 3103 | 6195s | 2.4s | 6197s |
| MIPS | 18123 | 18343 | 906 | 1058s | 1s | 1059s |
| Average | 8015 | 8128 | 918 | 1303s | 0.8s | 1304s |

One major problem of gate-level simulation is the slow simulation speed. Therefore, the compactness of generated tests is critical to reduce the overall debug time. When the generated test patterns are not compact, a lot more time is usually consumed in simulation than in generating tests. From Table I, 1000 test vectors generated by our approach are significantly better than 10K random vectors in both coverage and compactness of tests. While the tests generated by ATPG are slightly more compact in small benchmarks, its performance is the worst among the three approaches.

In brief, hardware Trojans are threats to assets in integrated circuits. To detect hardware Trojans, side-channel analysis is a widely used approach. Existing path delay-based side-channel analysis techniques are not effective since the difference in path delays between the golden design and the Trojan-inserted design is negligible compared to process variation and environmental noise margins. In accordance with embodiments of the present disclosure, an automated test generation approach is employed to take advantage of logic testing in maximizing the difference in path delays. Compared to existing research efforts that fix one critical path, such an approach explores two different critical paths for the same register in the two designs, resulting in a significantly large difference in path delays. Experimental results using a diverse set of benchmarks demonstrated that an exemplary approach of the present disclosure outperforms state-of-the-art path delay-based side-channel analysis techniques. Specifically, an exemplary approach of the present disclosure is able to detect most of the Trojans while state-of-the-art techniques fail to detect most of them in large designs when process variation and noise margin is higher than 7.5%.

Figure 8:
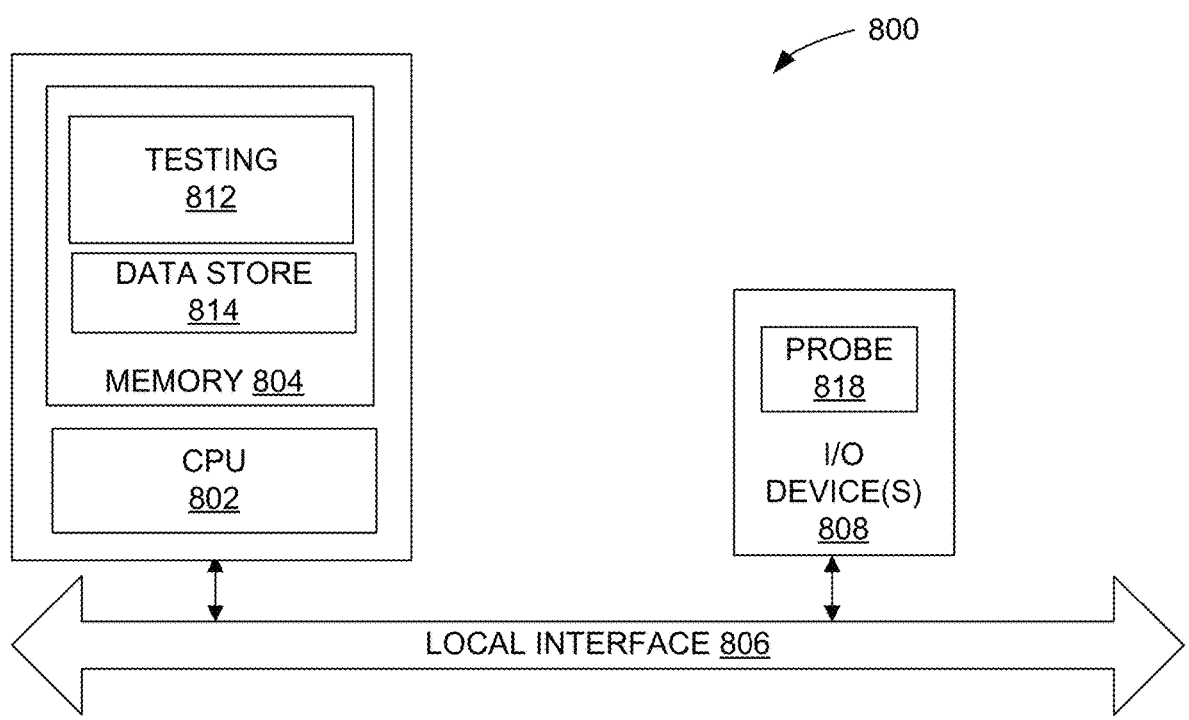
FIG. 8 depicts a schematic block diagram of a computing device that can be used to implement various embodiments of the present disclosure

FIG. 8 depicts a schematic block diagram of a computing device 800 that can be used to implement various embodiments of the present disclosure. An exemplary computing device 800 includes at least one processor circuit, for example, having a processor 802 and a memory 804, both of which are coupled to a local interface 806, and one or more input and output (I/O) devices 808. The local interface 806 may comprise, for example, a data bus with an accompanying address/control bus or other bus structure as can be appreciated.

Stored in the memory 804 are both data and several components that are executable by the processor 802. In particular, stored in the memory 804 and executable by the processor 802 are testing logic/instructions 812 (e.g., Algorithm 1 and/or Algorithm 2) that are configured to produce test patterns that are likely to activate trigger conditions in a test integrated circuit device and perform delay-based side-channel analysis by analyzing output changes in delay propagations across critical paths of the a design under test (DUT) or test integrated circuit device. Also stored in the memory 804 may be a data store 814 and other data. The data store 814 can include stored propagation delay values for golden integrated circuit designs and threshold values that can be compared against propagation delay values measured for the DUT, and potentially other data. In addition, an operating system may be stored in the memory 804 and executable by the processor 802. The I/O devices 808 may include input devices, for example but not limited to, a keyboard, mouse, a circuit probe 818, etc. Furthermore, the I/O devices 808 may also include output devices, for example but not limited to, a printer, display, etc.

Certain embodiments of the present disclosure can be implemented in hardware, software, firmware, or a combination thereof. If implemented in software, the test generation and delay-based side-channel analysis logic or functionality are implemented in software or firmware that is stored in a memory and that is executed by a suitable instruction execution system. If implemented in hardware, the test generation and delay-based side-channel analysis logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A method of detecting a Trojan inserted integrated circuit design comprising:
   applying test patterns as inputs to a golden integrated circuit device, wherein the test patterns are ordered to maximize a delay deviation between the golden integrated circuit device and the Trojan inserted integrated circuit design;
   measuring a propagation delay of a critical path within the golden integrated circuit device;
   applying the test patterns as inputs to a test integrated circuit device;

measuring a propagation delay of a critical path of the test integrated circuit device;

comparing the propagation delay of the test integrated circuit device with the propagation delay of the golden integrated circuit device; and determining the test integrated circuit device to be a Trojan inserted integrated circuit device when the propagation delay of the test integrated circuit device exceeds the propagation delay of the golden integrated circuit device by a threshold value.

2. The method of claim 1, wherein the test patterns activate a triggering condition of a Trojan circuit that is present in the test integrated circuit device and is not present in the golden integrated circuit device.

3. The method of claim 2, wherein the critical path of the test integrated circuit device is different from the critical path of the golden integrated circuit device responsive to application of the test patterns as inputs, wherein the propagation delay of the test integrated circuit device exceeds the propagation delay of the golden integrated circuit device by a threshold value.

4. The method of claim 1, further comprising determining the test integrated circuit device to not be a Trojan inserted integrated circuit device when the propagation delay of the test integrated circuit device does not exceed the propagation delay of the golden integrated circuit device by the threshold value.

5. The method of claim 1, wherein the test patterns are generated using a Boolean satisfiability (SAT)-based approach.

6. The method of claim 1, wherein a Hamming-distance based reordering of the test patterns is performed.

7. An apparatus for detecting a Trojan inserted integrated circuit design comprising:
a computer having memory and a processor that is configured to:
receive an output signal from an integrated circuit device;
apply test patterns as inputs to a golden integrated circuit device, wherein the test patterns are ordered to maximize a delay deviation between the golden integrated circuit device and the Trojan inserted integrated circuit design;
receive an output signal from the golden integrated circuit device in response to the applied test patterns;
measure a propagation delay of a critical path within the golden integrated circuit device;
store the propagation delay for the golden integrated circuit device in a data store;
apply the test patterns as inputs to a test integrated circuit device;
receive an output signal from the test integrated circuit device in response to the applied test patterns;
measure a propagation delay of a critical path of the test integrated circuit device;
compare the propagation delay of the test integrated circuit device with the propagation delay of the golden integrated circuit device from the data store; and
determine the test integrated circuit device to be a Trojan inserted integrated circuit device when the propagation delay of the test integrated circuit device exceeds the propagation delay of the golden integrated circuit device by a threshold value.

8. The apparatus of claim 7, wherein the test patterns activate a triggering condition of a Trojan circuit that is present in the test integrated circuit device and is not present in the golden integrated circuit device.

9. The apparatus of claim 8, wherein the critical path of the test integrated circuit device is different from the critical path of the golden integrated circuit device responsive to application of the test patterns as inputs, wherein the propagation delay of the test integrated circuit device exceeds the propagation delay of the golden integrated circuit device by a threshold value.

10. The apparatus of claim 7, wherein the computer having the memory and the processor is further configured to determine the test integrated circuit device to not be a Trojan inserted integrated circuit device when the propagation delay of the test integrated circuit device does not exceed the propagation delay of the golden integrated circuit device by the threshold value.

11. The apparatus of claim 7, wherein the test patterns are generated using a Boolean satisfiability (SAT)-based approach.

12. The apparatus of claim 7, wherein a Hamming-distance based reordering of the test patterns is performed.

13. A non-transitory computer readable storage medium having instructions stored thereon that, in response to execution by a computing device, cause the computing device to perform operations comprising:
applying test patterns as inputs to a golden integrated circuit device, wherein the test patterns are ordered to maximize a delay deviation between the golden integrated circuit device and a Trojan inserted integrated circuit design;
measuring a propagation delay of a critical path within the golden integrated circuit device;
applying the test patterns as inputs to a test integrated circuit device;
measuring a propagation delay of a critical path of the test integrated circuit device;
comparing the propagation delay of the test integrated circuit device with the propagation delay of the golden integrated circuit device; and
determining the test integrated circuit device to be a Trojan inserted integrated circuit device when the propagation delay of the test integrated circuit device exceeds the propagation delay of the golden integrated circuit device by a threshold value.

14. The non-transitory computer readable storage medium of claim 13, wherein the test patterns activate a triggering condition of a Trojan circuit that is present in the test integrated circuit device and is not present in the golden integrated circuit device.

15. The non-transitory computer readable storage medium of claim 13, wherein the operations further comprise determining the test integrated circuit device to not be a Trojan inserted integrated circuit device when the propagation delay of the test integrated circuit device does not exceed the propagation delay of the golden integrated circuit device by the threshold value.

16. A method of detecting a Trojan inserted integrated circuit design comprising:
applying test patterns as inputs to a golden integrated circuit device;
measuring a propagation delay of a critical path within the golden integrated circuit device;
applying the test patterns as inputs to a test integrated circuit device;
measuring a propagation delay of a critical path of the test integrated circuit device;

comparing the propagation delay of the test integrated circuit device with the propagation delay of the golden integrated circuit device; and determining the test integrated circuit device to be a Trojan inserted integrated circuit device when the propagation delay of the test integrated circuit device exceeds the propagation delay of the golden integrated circuit device by a threshold value, wherein the test patterns activate a plurality of rare nodes within the golden integrated circuit device and the test integrated circuit device.

17. An apparatus for detecting a Trojan inserted integrated circuit design comprising:

a computer having memory and a processor that is configured to:

receive an output signal from an integrated circuit device;

apply test patterns as inputs to a golden integrated circuit device;

receive an output signal from the golden integrated circuit device in response to the applied test patterns;

measure a propagation delay of a critical path within the golden integrated circuit device;

store the propagation delay for the golden integrated circuit device in a data store;

apply the test patterns as inputs to a test integrated circuit device;

receive an output signal from the test integrated circuit device in response to the applied test patterns;

measure a propagation delay of a critical path of the test integrated circuit device;

compare the propagation delay of the test integrated circuit device with the propagation delay of the golden integrated circuit device from the data store; and determine the test integrated circuit device to be a Trojan inserted integrated circuit device when the propagation delay of the test integrated circuit device exceeds the propagation delay of the golden integrated circuit device by a threshold value, wherein the test patterns are configured to activate a plurality of rare nodes within the golden integrated circuit device and the test integrated circuit device.

* * * * *